United States Patent [19]

Motsch

[11] 4,368,933

[45] Jan. 18, 1983

[54] HOUSING OF A BEARING WITH A PRESSURE-COMPENSATING ARRANGEMENT

[75] Inventor: Alfons Motsch, Bergneustadt, Fed. Rep. of Germany

[73] Assignee: Kuhbier GmbH & Co., Wipperfürth, Fed. Rep. of Germany

[21] Appl. No.: 302,070

[22] Filed: Sep. 14, 1981

[30] Foreign Application Priority Data

Sep. 26, 1980 [DE] Fed. Rep. of Germany ....... 3036287

[51] Int. Cl.$^3$ .............................................. F16C 35/02
[52] U.S. Cl. .................................. 308/245; 308/36.1; 308/187.1; 384/150
[58] Field of Search ..................... 308/245, 36.1, 187.1, 308/36.2, 121, 187; 74/606 R

[56] References Cited

U.S. PATENT DOCUMENTS

| | | | |
|---|---|---|---|
| 2,266,300 | 12/1941 | Bebinger | 308/245 |
| 3,382,018 | 5/1968 | Brkich | 308/245 |
| 3,770,992 | 11/1973 | Veglia | 308/245 |
| 4,191,072 | 3/1980 | Ehrlinger | 74/606 R |

*Primary Examiner*—Lenard A. Footland
*Attorney, Agent, or Firm*—Michael J. Striker

[57] ABSTRACT

In a housing bearing composed of two parts connected to each other to form a chamber receiving a bearing a pressure-compensating valve is provided which includes an enclosure secured to the housing and having an internal wall, and a cover connected to the enclosure and spaced therefrom to receive a diaphragm. The diaphragm has a number of needle-shaped perforations which open when the diaphragm expands in response to overpressure in the bearing housing and close when the diaphragm is in inoperative position.

16 Claims, 3 Drawing Figures

HOUSING OF A BEARING WITH A PRESSURE-COMPENSATING ARRANGEMENT

BACKGROUND OF THE INVENTION

The present invention relates to a housing of a bearing. More particularly, the invention relates to a pressure-compensating arrangement for a bearing housing equipped with a seal protecting the housing against lubrication oil leakage.

Very often, in the art of bearing housings, particularly those which are employed in the equipment used for manufacturing food stuffs, pharmaceutical or chemical products it is required to totally prevent any leakage of lubrication oil from ball and roller bearings. The difficulties in preventing of even very small amounts of lubrication from leaking from bearing housings are encountered in practice because oil particles spinning during operation produce an over pressure in air contained in the bearing housing; although this pressure is not too great it, however may cause penetration of lubrication oil even through very reliable seals.

Efforts have been made to solve the problem. A number of narrow ventilation openings in the upper part of the bearing housing have been suggested; this effort, however failed. If these openings have been made sufficiently narrow to prevent spray water for cleaning of the machine from entering the bearing housing these openings became blocked by lubrication oil particles spinning in the housing during operation. If these openings were rather large to avoid their clogging by the oil particles these openings in this case failed to prevent cleaning spray water from passing through them into the interior of the bearing housing; the relatively large openings were also unable to keep oil particles within the bearing housing. It is to be understood that in production of food stuffs and pharmaceutical products it is necessary to regularly clean and wash the equipment so that the size of the ventilation openings suggested in the art was rather important.

None of the conventional art, however has suggested pressure-compensating means which prevent leakage of the lubrication oil of the housing and at the same time prevent admission of spray cleaning water into the bearing housing.

SUMMARY OF THE INVENTION

It is an object of the invention to provide an improved bearing housing.

Another object of the invention to provide a pressure-compensating arrangement which totally avoids lubrication leakage from the bearing housing.

Still another object of the invention to provide a pressure-compensating valve which opens during operation under influence of overpressure in the bearing housing and which communicates the interior of the housing with atmosphere.

Still further object of the invention is to provide a pressure-compensating valve which closes when the machine is stand-still.

These and other objects of the invention are attained by a a bearing housing having two parts connected to each other and receiving a bearing mounted on a shaft and comprising in combination means on said shaft for sealing the housing against lubrication oil leakage and pressure-compensating means mounted at the side of the housing opposite to that carrying said sealing means, said pressure-compensating means including an enclosure connected to one of said parts and a cover closing said housing and connected to said enclosure, said cover being spaced from said enclosure to form a space therebetween, and an elastic diaphragm interposed in said space and formed with a number of perforations arranged in communication with ambient air, said diaphragm being operative for compensation for overpressure which may occur in said housing due to the spinning movement of lubrication oil particles contained in said housing during operation.

The perforations may be of a needle-shaped configuration and adapted to open when the diaphragm expands under the over pressure and close when said diaphragm retracts.

The enclosure may have an inner wall, said wall being spaced from said enclose to form said space. This wall may be provided with an opening forming a first air passage and communicating an interior of said housing with said space.

During operation, under overpressure in the bearing housing the diaphragm expands as a balloon so that needle-shaped openings open and excessive air escapes through them to the atmosphere. When the machine is in inoperative position these openings close and thus prevent any penetration of water or moisture into the interior of the bearing housing.

The cover may be provided with an opening forming a second air passage.

The first air passage may be substantially coaxial with the bearing shaft.

The inner wall of the closure may be formed at the lower part thereof with a bore, said bore admitting oil particles spinned out from the interior of the housing back to said interior.

The outer cover protects the diaphragm against damage or any other exterior influence; the inner wall serves on one hand for mounting and supporting the diaphragm and, on the other hand, for keeping spinning lubrication particles within the interior of the bearing housing. A very small amount of oil unavoidably passing through the air passage into the diaphragm space returns to the bearing housing through the bore in the inner wall of the closure.

The perforations or openings may be preferably formed at an upper part of the diaphragm. The second air passage may be in turn preferably formed at the lower part of the cover. Due to the provision of perforations in the upper part of the diaphragm oil particles spinning in the lower part of the housing can not clog the perforations.

The enclosure may be formed with a snapping circular formation and the cover may be formed with a circular groove receiving said formation in a snapped-in relation.

The sealing means positioned on the opposite end of the bearing housing may include a recessed support connected to the second one of the housing parts, a closing shell closing the housing from said opposite end and a sealing ring positioned in said support.

It is to be understood that pressure-release valve can be employed not only in any bearing housing but can be mounted at any bearing in which sealed bearing-housing-unit is utilized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
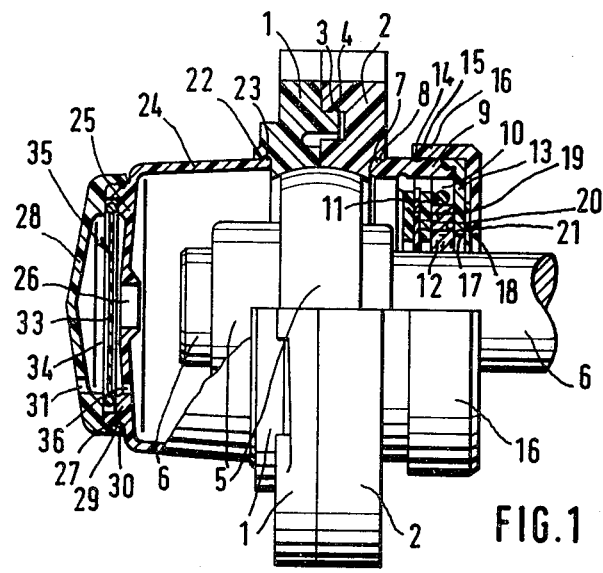
FIG. 1 is a side view, partially in section, of a bearing housing equipped with a pressure-compensating valve according to the invention.
Figure 2:
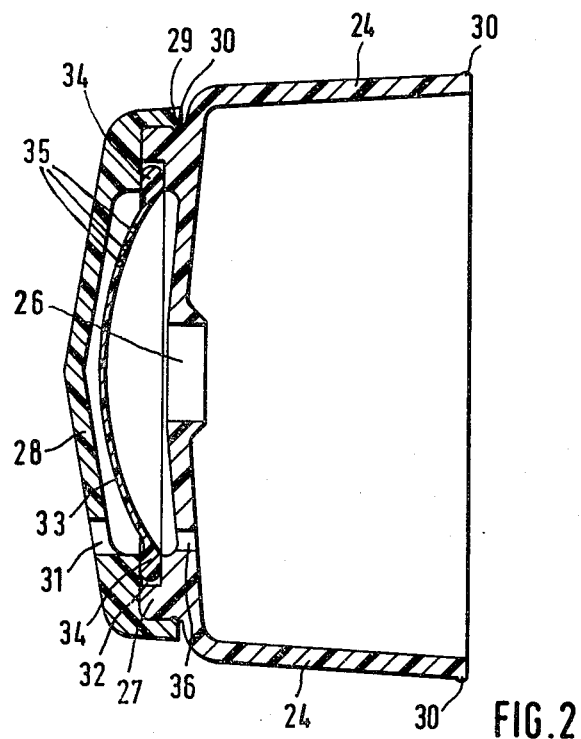
FIG. 2 is an enlarged partial sectional view of the pressure-compensating valve of FIG. 2.
Figure 3:
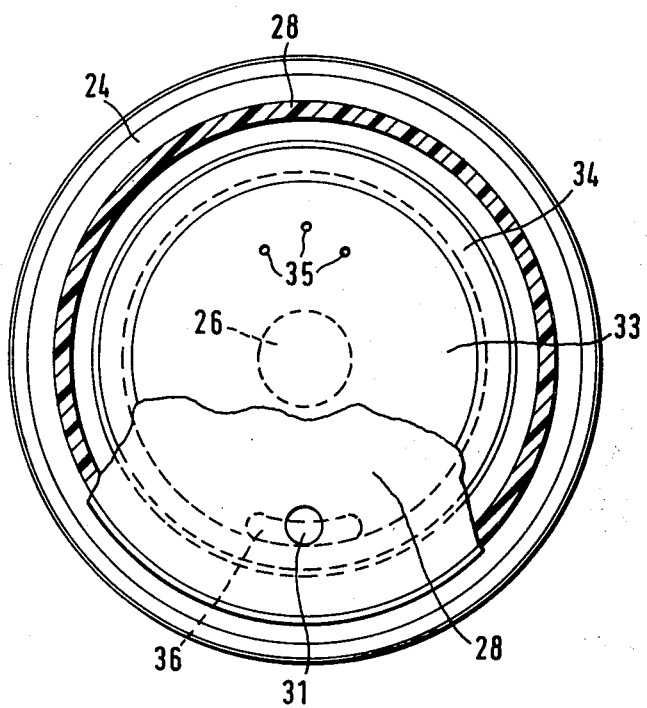
FIG. 3 is a front view of the pressure-compensating valve with a portion removed, of FIG. 2.

FIG. 1 shows a bearing housing in accordance with the present invention, which can be made out, for example, of a synthetic plastic material, such as polymethylene oxide, by injection molding.

In production of foodstuffs or pharmaceutical products utilization of synthetic plastic materials has been found advantageous because it substantially decreased costs of production. It should be realized that although the bearing housing in the preferred embodiment has been manufactured of synthetic plastic material the invention can be readily applied to a housing made out of metal.

The bearing housing illustrated in FIG. 1 includes two assembled ring-shaped housing shells 1 and 2. The two-part bearing housing similar to that described herein is disclosed in the German patent publication DE-GM7932611. The housing shells 1 and 2 are connected to each other by means of a snapping projection 3 formed on the shell 1 and a circular groove 4 provided in the shell 2. The projection 3 elastically engages the groove 4 so that a force-locking interengaging connection is obtained between shells 1 and 2.

Before housing shells 1 and 2 are assembled a bearing 5 carrying a shaft 6 is inserted into the housing. After the bearing has been inserted into the housing shells 1 and 2 a support 9 is elastically clamped on the housing by means of a snapping formation 7 on the support 9, which elastically engages a groove 8 provided at the outer side of the housing shell 2. The annular support 9 is in turn provided with a stepped circular recess 10 into which a felt sealing ring 12 is inserted. Felt sealing ring 12 is biased and supported in its position by a circular spring 11. The outer diameter of the felt sealing ring 12 is smaller than the inner diameter of recess 10; this results in a possible displacement of the ring 12 in a radial direction.

Support 10 is closed by an outer counterring 13 and a closing shell 16, the latter overlapping the outer surface of support 9 thus sealingly closing the housing. The closing shell 16 is formed with an annular recess 17 which receives a relatively flat disc-shaped outer protecting ring 18 which may be made out of synthetic plastic material or aluminum, or any other suitable material. The outer diameter of ring 18 which is approximately equal to the diameter of sealing ring 12 is smaller than the diameter of recess 17 so that ring 18 has a freedom for radial movement within the recess 17.

In the interior of the bearing housing, namely in the recess 10 of support 9 an inner counterring 19 is mounted. In a stepped recess 20 formed in the support 9 an inner protecting ring 21 is positioned which is similar to the protecting ring 18.

As clearly seen in FIG. 1 of the drawings, the inner diameters of, in succession, inner counterring 19, outer counterring 13 and the closing shell 16 form together a tapering conical surface with an axis coinsiding with the axis of shaft 6. So-formed acute angle substantially facilitates assembling of the bearing housing in accordance with the invention. Such sloped position of the bearing axis makes possible the assembling of spherically-shaped bearing within the spherically-shaped inner wall of the bearing housing. Not-withstanding such sloped position of the parts closing the bearing 5 in the housing the shaft 6 is reliably sealed by the felt sealing ring 12 so that leakage of lubrication oil from the bearing housing is prevented. In the same manner both protecting rings 18 and 21 seal the bearing housing against the oil leakage and also against penetration into the bearing of spray water from outside, which water is usually utilized for cleaning.

The pressure-compensating valve according to the invention is a part of the bearing housing and includes an enclosure 24 of synthetic plastic material or any other suitable material. The housing shell 1 has a stepped-like recess 22 at the outer edge thereof. An annular groove 23 is formed in this edge. The enclosure 24 is snapped in the recess 23 by means of a respective snapping circular formation provided on the rim of the enclosure, which elastically engages within groove 23. The enclosure 24 has a wall 25 formed with a central opening 26 constituting an air passage. Wall 25 is in turn formed with an annular projection 27 which together with a respective groove provided in a cover 28 forms a snapping-in arrangement 29, 30.

The outer cover 28 which may also be made of synthetic plastic material is provided at its bottom part with an air passage 31 which communicates the region behind cover 28 with the ambient air and simultaneously serves for draining water of condensation as well as spray water.

Between the cover 28 and wall 25 of enclosure 24 an elastic diaphragm 33 is inserted which is supported by a fastening formation 34. Diaphragm 33 is positioned in the recess formed within the annular projection 27. At its upper side the diaphragm has a number of needle-shaped openings or perforations 35 which are so arranged that they close when the diaphragm is relieved and open if the diaphragm expands. Such effect can be obtained when openings 35 are punctured in the expanded diaphragm.

The inner wall 25 of the enclosure 24 is formed at its lower portion with an oil-return bore 36 which communicates the space between the diaphragm 33 and the wall 25 with the interior of the bearing housing. This bore serves for returning lubrication particles spinned out from the interior of the housing.

The operation of the pressure-compensating valve including enclosure 24 and perforated elastic diaphragm 33 is as follows: During rotations of balls or rollers of the bearing 5 lubrication oil particles whirl in a turbine-like manner thus causing overpressure in air contained in the bearing housing; oil under such conditions presses against the internal walls of the housing including the seams between different components of the housings, particularly against the seal-shaft connection 8, 12. Without pressure-compensating valve 24, 33 lubrication particles will be forced through the seams outside the bearing housing. In the device according to the invention, as pressure rises in the interior of the bearing housing elastic diaphragm 33 expands and the needle-shaped openings 35 will open to thus compensate pressure in the housing. Only a relatively small portion of spinning oil particles will be discharged from the housing through the air channel 26, these particles will fall onto the surface of the diaphragm 33. Inasmuch as perforations 35 are formed at the upper part of the diaphragm oil particles can not block these perforations the oil particles will rather move towards the middle and lower part of the diaphragm and then move back into the interior of the bearing housing through the bore 36.

The outer shell-shaped cover 28 protects the diaphragm 33 against any external influence, for example against spray water used for cleaning. The opening 31 at the lower part of cover 28 communicates the diaphragm with the atmosphere and at the same time serves for draining of water of condensation and spray water.

In accordance with the preferred embodiment of the invention reliable sealing of shaft 6 is obtained. The invention can not be limited to the art involving various seals although it is very advantageous for sealing of shafts, for example for such arrangements where widely employed double-lip rubber seals are utilized. In the double-lip-sealing arrangements it is not necessary to provide an above-described sloped arrangement of the components surrounding the shaft because the double-lip-seals are less dense at one side than at the other side.

It will be understood that each of the elements described above, or two or more together, may also find a useful application in other types of pressure-compensating arrangements differing from the types described above.

While the invention has been illustrated and described as embodied in a bearing house with a pressure compensating arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a bearing housing having two parts connected to each other and receiving a bearing mounted on a shaft, a combination comprising means on said shaft for sealing the housing against lubrication oil leakage, and pressure-compensating means mounted at the side of the housing opposite to that carrying said sealing means; said pressure-compensating means including an enclosure connected to one of said parts and a cover closing said housing and connected to said enclosure, said cover being spaced from said enclosure to form a space therebetween, and an elastic diaphragm interposed in said space and formed with a number of perforations arranged in communication with ambient air, said diaphragm being operative for compensation of over pressure which may occur in said housing due to the spinning movement of lubrication oil particles contained in said housing during operation.

2. The combination of claim 1, wherein said perforations are of a needle-shaped configuration and adapted to open when said diaphragm expands under said overpressure and close when said diaphragm retracts.

3. The combination of claim 2, wherein said enclosure has an inner wall, said wall being spaced from said enclose to form said space.

4. The combination of claim 3, wherein said inner wall is provided with an opening forming a first air passage and communicating an interior of said housing with said space.

5. The combination of claim 4, wherein said cover is formed with an opening forming a second air passage.

6. The combination of claim 5, wherein said first air passage is substantially coaxial with said shaft.

7. The combination of claim 6, wherein said inner wall of said closure is formed at the lower part thereof with a bore, said bore admitting lubrication oil particles spinned out from the interior of the housing back to said interior.

8. The combination of claim 7, wherein said perforations are formed at an upper part of said diaphragm.

9. The combination of claim 8, wherein said second air passage is formed at a lower part of said cover.

10. The combination of claim 9, wherein said housing parts are made out of synthetic plastic material.

11. The combination of claim 10, wherein said enclosure is formed with a snapping circular formation and said cover is formed with a circular groove receiving said formation in a snapped-in relation.

12. The combination of claim 11, wherein said enclosure and said cover are made out of synthetic plastic material.

13. The combination of claim 9, wherein said sealing means are positioned at an end of said housing opposite to that carrying said pressure-compensating means.

14. The combination of claim 13, wherein said sealing means include a recessed support connected to the second one of said housing parts, a closing shell closing said housing from said opposite end, and a sealing ring positioned in said support.

15. The combination of claim 14, further including rings in said support for protecting said sealing ring.

16. The combination of claim 15, wherein said sealing ring is of felt.

* * * * *